(12) United States Patent
Gibb et al.

(10) Patent No.: US 11,975,747 B2
(45) Date of Patent: May 7, 2024

(54) BRIDGE CRANE APPARATUS FOR OPENING AND CLOSING RAILCAR LIDS

(71) Applicant: RayHawk Technologies Inc., Saskatoon (CA)

(72) Inventors: Benjamin Gibb, Saskatoon (CA); Thomas Boehm, Skyview Estates (CA); John Srayko, Saskatoon (CA)

(73) Assignee: RayHawk Technologies Inc. (CA)

( * ) Notice: Subject to any disclaimer, the term of this patent is extended or adjusted under 35 U.S.C. 154(b) by 0 days.

(21) Appl. No.: 17/785,741

(22) PCT Filed: Mar. 28, 2022

(86) PCT No.: PCT/CA2022/050460
§ 371 (c)(1),
(2) Date: Jun. 15, 2022

(87) PCT Pub. No.: WO2022/204796
PCT Pub. Date: Oct. 6, 2022

(65) Prior Publication Data
US 2023/0303134 A1 Sep. 28, 2023

Related U.S. Application Data

(60) Provisional application No. 63/168,039, filed on Mar. 30, 2021.

(51) Int. Cl.
*B61D 39/00* (2006.01)
*B61D 7/00* (2006.01)
(Continued)

(52) U.S. Cl.
CPC ............ *B61D 39/007* (2013.01); *B61D 7/00* (2013.01); *B61D 17/16* (2013.01); *B61D 39/001* (2013.01);
(Continued)

(58) Field of Classification Search
CPC .. B61D 39/007; B61D 39/002; B61D 39/006; B61D 17/16; B66C 1/62; B66C 17/06; B25J 9/1669
(Continued)

(56) References Cited

U.S. PATENT DOCUMENTS

| 6,092,471 A | 7/2000 | Early |
| 9,580,086 B2 * | 2/2017 | Low ..................... B61D 39/002 |

(Continued)

FOREIGN PATENT DOCUMENTS

| CA | 3062052 A1 | 5/2020 |
| CA | 3130876 A1 | 8/2020 |

(Continued)

OTHER PUBLICATIONS

Search Report and Written Opinion dated May 6, 2022 of International Application No. PCT/CA2022/050460.

*Primary Examiner* — Zachary L Kuhfuss
(74) *Attorney, Agent, or Firm* — Spencer Fane, LLP

(57) ABSTRACT

A bridge-supported tool for opening and closing lids located on top of railcars. The bridge has two sides and a cross member between the sides that moves along the sides, the cross member supports a tool carriage that moves along the cross member, the tool carriage has a tool engagement interface for retaining a selected tool and the interface is vertically moveable, such that the tool is moveable to any selected location in the space defined by the bridge. A controller can be used to direct the positioning of the tool by controlling the movements of the cross member, tool carriage and tool engagement interface.

78 Claims, 14 Drawing Sheets

(51) Int. Cl.
*B61D 17/16* (2006.01)
*B66C 1/62* (2006.01)
*B66C 17/06* (2006.01)
*B25J 9/16* (2006.01)

(52) U.S. Cl.
CPC .............. *B61D 39/006* (2013.01); *B66C 1/62* (2013.01); *B66C 17/06* (2013.01); *B25J 9/1669* (2013.01); *B61D 39/002* (2013.01)

(58) Field of Classification Search
USPC .............. 105/241.2, 377.01, 377.05, 377.06, 105/377.07; 296/100.1; 414/329, 373, 414/389
See application file for complete search history.

(56) References Cited

U.S. PATENT DOCUMENTS

| | | | | |
|---|---|---|---|---|
| 2010/0326318 | A1* | 12/2010 | Baranowski | B61D 39/006 |
| | | | | 105/377.01 |
| 2013/0192488 | A1* | 8/2013 | Low | B61D 39/002 |
| | | | | 105/377.01 |
| 2020/0156670 | A1* | 5/2020 | Murray | B61D 39/007 |
| 2021/0054576 | A1* | 2/2021 | Markelz | B61D 15/02 |

FOREIGN PATENT DOCUMENTS

| | | | | | |
|---|---|---|---|---|---|
| CN | 109946113 | A | * | 6/2019 | ............. B02C 13/14 |
| KR | 102283705 | B1 | * | 7/2021 | ............... B66C 6/00 |

* cited by examiner

BRIDGE CRANE APPARATUS FOR OPENING AND CLOSING RAILCAR LIDS

TECHNICAL FIELD OF THE INVENTION

The present invention relates to loading of railcars, and more particularly to systems and methods for opening and closing of railcar lids.

BACKGROUND OF THE INVENTION

It is known in the field of transportation to employ railcar trains with top-mounted lids for the transport of granular materials such as mined minerals and agricultural grains. Such lids are commonly elongate and latched when in a closed orientation, and such latches are also often sealed for security purposes. When it is desired to open a railcar lid, either to inspect the railcar interior or contents or to load the railcar, one common practice is to cease forward movement of the train and engage in manual seal removal, latches disengagement and opening of the lid, although it is becoming increasingly common to work on railcars while in motion. In either case this commonly involves placing personnel on top of railcars, introducing safety issues due to working at height and the potential for slip/trip/fall hazards from intentional or unintentional railcar shifting. Further, manual opening and closing of railcar lids introduces inefficiencies and delays, reducing throughput and increasing costs.

Various prior art solutions have been proposed, particularly introducing differing levels of automation. For example, U.S. Pat. No. 3,831,792 to Waterman et al. employs a custom handle designed to follow a track in order to execute a toolpath for opening and closing a railcar lid. In another example, Patent Cooperation Treaty Application No. PCT/CA2019/051667 to Murray et al. teaches a system involving a plurality of robot arms that are controlled in part by input from sensors detecting railcar velocity and lid/latch location.

However, many of the prior art solutions require increased capital cost and ongoing maintenance costs, and in some cases are restricted in terms of the lid types that can be serviced.

What is needed, therefore, is a solution that reduces safety risks from manual work settings while presenting reasonable capital and operational costs and applicability to standard lid sizes and configurations.

SUMMARY OF THE INVENTION

According to a first broad aspect of the present invention, there is provided a system for operating a lid of a railcar, the system comprising: a bridge frame comprising two parallel spaced-apart side members; a cross member between and engaging the side members and selectively moveable therealong in a direction parallel to the side members; a tool carriage engaging the cross member and selectively moveable therealong in a direction perpendicular to the side members, the tool carriage comprising a selectively vertically moveable tool engagement interface; and a tool configured for receipt and retention by the tool engagement interface, the tool configured to engage and operate the lid of the railcar; such that the tool can be selectively positioned in any of a plurality of locations relative to the lid of the railcar.

In some exemplary embodiments of the first broad aspect, the two parallel spaced-apart side members are reinforced or supported to reduce structural deflection where deflection could cause inaccuracy in tool positioning. Where the two parallel spaced-apart side members are vertically supported on legs or columns, such legs or columns may also be reinforced or supported. This may help to ensure accurate positioning of tools and consistent mapping of objects within the tool working space.

In some exemplary embodiments of the first broad aspect, the bridge frame is sized and configured to receive the railcar beneath and between the side members. The cross member preferably comprises two paired cross members configured to receive the tool carriage therebetween.

The tool may be configured to open the lid, close the lid, or both open and close the lid. Where the lid of the railcar is secured with a latch, the tool may be configured to disengage the latch, engage the latch, or both disengage and engage the latch. The tool may be configured to scan a railcar interior when the lid is open and/or remove or apply a seal to a closed and latched lid.

Some exemplary systems further comprise a controller for executing commands to instruct movement of the cross member, the tool carriage and the tool engagement interface to selectively position the tool at a lid engagement location. The controller may be a programmable logic controller, but those skilled in the art will be aware of other types of controllers suitable for use with embodiments of the present invention. In some exemplary embodiments a computer is used to generate the commands that are executed by the controller. Such systems may further comprise at least one location sensor for detecting a location of the lid in three-dimensional space, the at least one location sensor configured to send a lid location signal to help generate the commands executed by the controller. Such systems may also further comprise at least one camera for detecting a moving speed of the lid when the railcar is in motion, the at least one camera configured to send a lid position and timestamp signal to help calculate velocity and thus help generate the commands executed by the controller.

In exemplary systems where the tool follows a dynamic toolpath (adjusted for velocity of the lid) to operate the lid, the controller executes commands to instruct movement of the cross member, the tool carriage and the tool engagement interface to move the tool along the dynamic toolpath. Exemplary systems may also comprise machine learning functionality to learn from past operating of the lid to improve future operating of the lid.

Some exemplary embodiments may further comprise a cleaning device for cleaning snow or debris from the lid of the railcar prior to the operating of the lid.

Where the latch is secured with a seal, the system preferably further comprises a tool for removing the seal. In some embodiments a toll is configured for applying a seal.

Some exemplary systems further comprise a sampling device lowerable into an interior of the railcar when the lid has been opened by the tool.

Some exemplary embodiments comprise a plurality of tools of differing functionality, the tool engagement interface configured for selective engagement with and disengagement from each of the plurality of tools.

According to a second broad aspect of the present invention, there is provided a system for opening and closing a lid of a railcar, the system comprising: first and second bridge frames in parallel spaced-apart alignment, each of the first and second bridge frames comprising: two parallel spaced-apart side members; a cross member between and engaging the side members and selectively moveable therealong in a direction parallel to the side members; a tool carriage engaging the cross member and selectively moveable therealong in a direction perpendicular to the side members, the tool carriage comprising a selectively vertically moveable tool engagement interface; and a tool configured for receipt and retention by the tool engagement interface, the tool configured to engage and operate the lid of the railcar, such that the tool can be selectively positioned in any of a plurality of locations relative to the lid of the railcar; the tool on the first bridge frame configured for opening the lid; and the tool on the second bridge frame configured for closing the lid.

In some exemplary embodiments of the second broad aspect, the two parallel spaced-apart side members of each of the first and second bridge frames are reinforced or supported to reduce structural deflection where deflection could cause inaccuracy in tool positioning. Where the two parallel spaced-apart side members are vertically supported on legs or columns, such legs or columns may also be reinforced or supported. This may help to ensure accurate positioning of tools and consistent mapping of objects within the tool working space.

In some exemplary embodiments of the second broad aspect, the first and second bridge frames are sized and configured to receive the railcar beneath and between their respective side members, and the cross member preferably comprises two paired cross members configured to receive the tool carriage therebetween.

Where the lid of the railcar is secured with a latch, the tool on the first bridge frame is preferably configured to disengage the latch to enable the opening of the lid, and the tool on the second bridge frame is preferably configured to engage the latch after the closing of the lid.

A controller may be used in some embodiments for executing commands to instruct movement of the cross members, the tool carriages and the tool engagement interfaces to selectively position the tools at a lid engagement location. The controller may be a programmable logic controller, but those skilled in the art will be aware of other types of controllers suitable for use with embodiments of the present invention. In some exemplary embodiments a computer is used to generate the commands that are executed by the controller. In some such embodiments, at least one location sensor is provided for detecting a location of the lid in three-dimensional space. The at least one location sensor may be a depth camera with deep vision processing to detect objects. The at least one location sensor is preferably configured to send a lid location signal to help generate the commands for the controller. Further, at least one velocity sensor may be provided for detecting a moving speed of the lid when the railcar is in motion. In some embodiments where the location sensor generates timestamps and object locations for the objects, the velocity sensor may use the timestamps and the object locations to calculate velocity. The at least one velocity sensor may be configured to send a lid velocity signal to help generate the commands executed by the controller. Where the tool is to follow a dynamic toolpath (adjusted for velocity of the lid) to open or close the lid, the controller executes commands to instruct movement of the cross member, the tool carriage and the tool engagement interface to move the tool along the dynamic toolpath. Exemplary embodiments may also comprises machine learning functionality to learn from past opening and closing of the lid to improve future opening and closing of the lid.

Some exemplary systems comprise a cleaning device for cleaning snow or debris from the lid of the railcar prior to the opening of the lid.

Where the latch is secured with a seal, the system preferably further comprises a tool for removing the seal after the latch is closed and before the disengaging of the latch.

Exemplary systems may further comprise a sampling device lowerable into an interior of the railcar when the lid has been opened by the tool. Further exemplary embodiments may include a camera for scanning a railcar exterior or lowerable into the railcar interior to scan the interior.

Some exemplary systems comprise a plurality of tools of differing functionality, the tool engagement interface then preferably configured for selective engagement with and disengagement from each of the plurality of tools.

According to a third broad aspect of the present invention, there is provided a method for operating a lid of a railcar, the method comprising the steps of:
a. providing a bridge frame comprising side members, a cross member between and engaging the side members and moveable therealong, a tool carriage engaging the cross member and moveable therealong, the tool carriage comprising a vertically moveable tool engagement interface retaining a tool configured to engage and operate the lid of the railcar, such that the tool can be positioned in any of a plurality of locations relative to the lid of the railcar;
b. moving the railcar between the side members;
c. by moving the cross member, the tool carriage and the tool engagement interface, locating the tool adjacent the lid; and
d. manipulating the tool to engage the lid to operate the lid.

In some exemplary embodiments of the third broad aspect, the method comprises reinforcing or supporting the side members of the bridge frame to reduce structural deflection where deflection could cause inaccuracy in tool positioning. Where the side members are vertically supported on legs or columns, such legs or columns may also be reinforced or supported. This may help to ensure accurate positioning of tools and consistent mapping of objects within the tool working space.

In some exemplary embodiments of the third broad aspect, a controller is used for the steps of moving the cross member, the tool carriage and the tool engagement interface to locate the tool adjacent the lid and for manipulating the tool to engage the lid to operate the lid.

Some exemplary methods may further comprise the step before step c. of sensing a location of the lid to enable the engaging of the lid by the tool. Further, exemplary methods may further comprise the step before step c. of sensing a velocity of the lid to enable the engaging of the lid by the tool. The controller may further be used to direct the tool along a dynamic toolpath to open the lid. Also, where exemplary systems comprise machine learning functionality, the method preferably comprises the further steps after step d. of assessing the manipulating of the tool and determining improvements to the manipulating of the tool for future use of the tool.

Exemplary methods may further comprise the step before step c. of cleaning the lid.

Where the lid is secured with at least one latch, the method preferably comprises the step before step d. of using the tool to disengage the latch. Where the latch is secured with a seal, the method preferably comprises the step of removing the seal before the step of disengaging the latch.

Some exemplary methods further comprise the step after step d. of lowering a sampling device into an interior of the railcar.

Where exemplary methods comprise the use of a plurality of tools each having differing functionality, the method comprises the step before step c. of selecting one of the plurality of tools based on functionality. Exemplary methods may further comprise the step of providing a second bridge frame, wherein the tool on the bridge frame is used to open the lid and a tool on the second bridge frame is used to close the lid.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention:

FIG. 3b is a bottom perspective view of the tool carriage of FIG. 3a.

FIG. 3c is a side elevation view of the tool carriage of FIG. 3a.

Figure 1A:
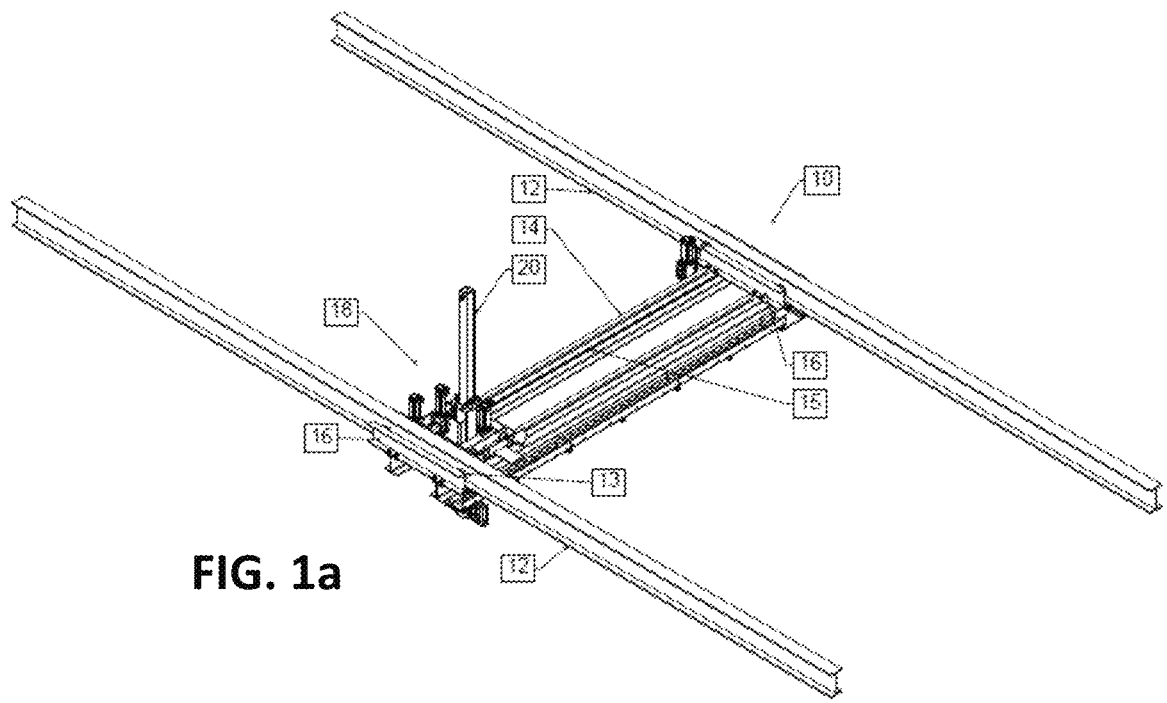
FIG. 1a is a perspective view of a bridge frame according to an embodiment of the present invention.
Figure 1B:
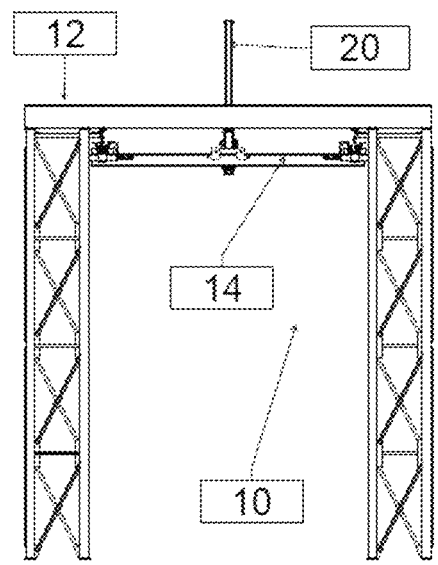
FIG. 1b is an elevation view of a bridge frame showing lattice-style beams as a form of reinforcement or support.
Figure 2:
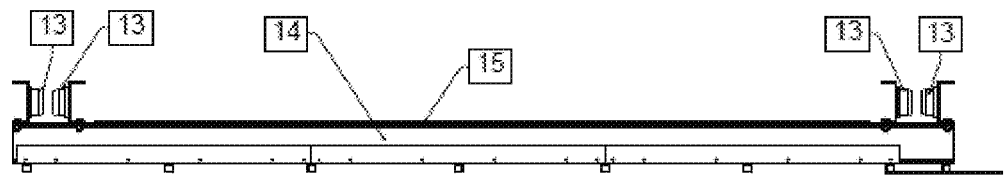
FIG. 2 is an elevation view of a cross member of a bridge frame.
Figure 3A:
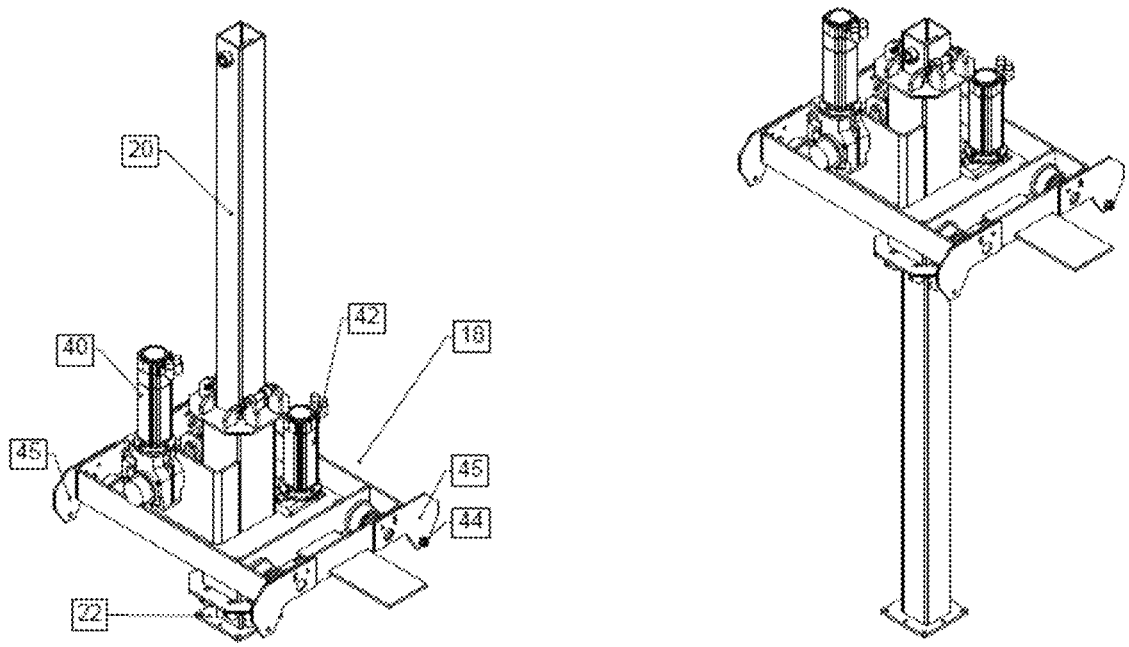
FIG. 3a is two top perspective views of a tool carriage, with the vertical shaft in the full extension positions.
Figure 3B:
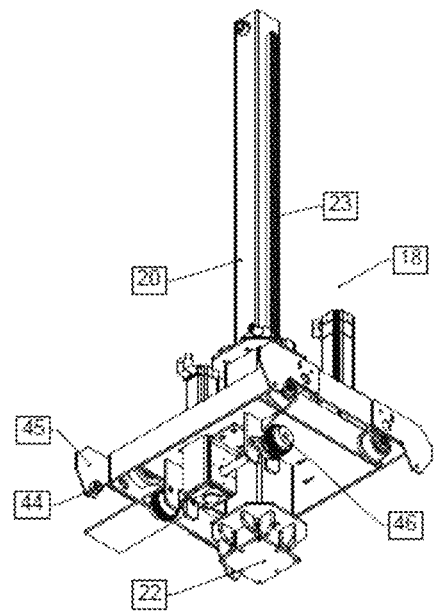
Figure 3C:
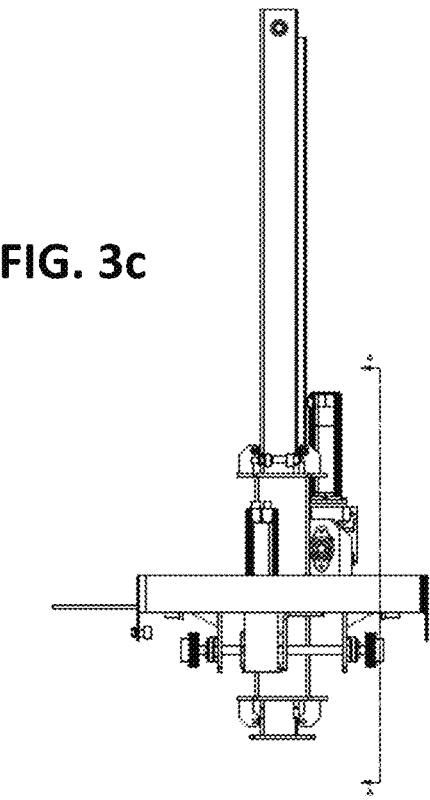
Figure 3D:
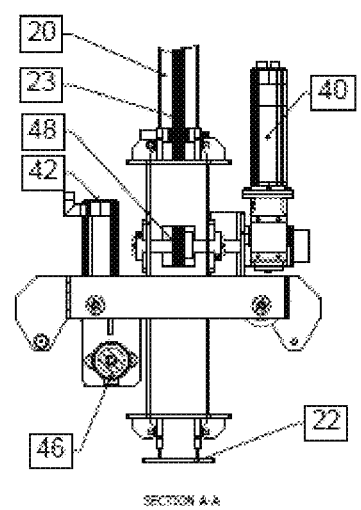
FIG. 3d is a sectional view across H-H of FIG. 3c.
Figure 4A:
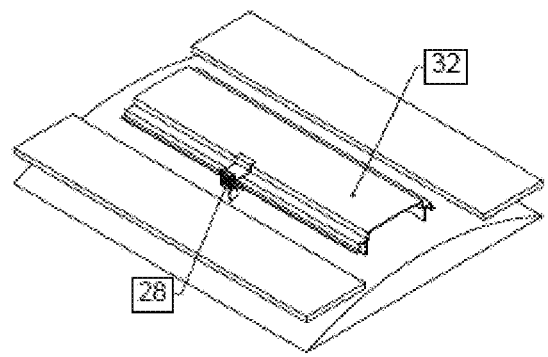
FIG. 4a is a perspective view of a railcar lid.
Figure 4B:
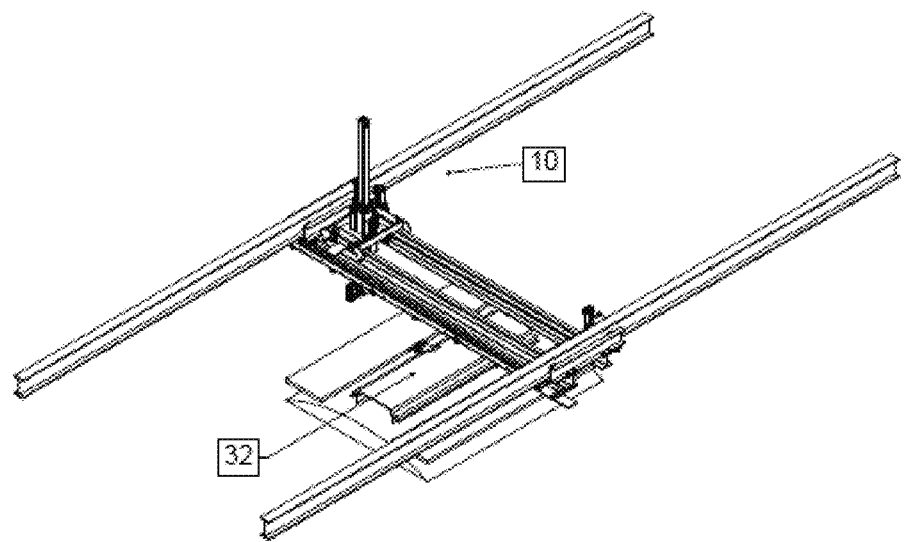
FIG. 4b is the railcar lid of FIG. 4a positioned under a test embodiment of a bridge frame.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense.

The present invention is directed to a bridge frame apparatus for supporting a tool for opening and closing railcar lids in a rail loading facility (indoor or outdoor), which may be executed in a semi-automated or fully-automated manner including when the railcars are in motion. The tool, or additional selectable tools, can also be used to remove and/or apply seals and disengage and engage latches securing the lids. Tools may be designed for scanning of railcar exteriors and interiors. Tools may be positioned in any number of locations within a three-dimensional space defined by the bridge frame, by movement of the cross member back-and-forth along the side members (first dimension), the tool carriage which moves side-to-side along the cross member (second dimension), and vertical movement of the tool engagement interface supporting the tool (third dimension).

Exemplary embodiments of the system can perform object detection, tracking, and identification for snow and debris removal from the railcar lid, seal removal, latch disengagement, lid opening, car inspection, lid closing, and latch engagement, as well as seal application and removal. The system is preferably comprised of a bridge frame, two or more cameras, a tool interchange device, a sampling device, and a cleaning device. Preferred embodiments use a vision system to track the speed of latches and lids; the velocity of these objects is used to improve object tracking and to enable manipulation of the bridge system, latch or lid assembly.

Preferred embodiments of the present invention can also be designed to work with all standard railcar types. This includes cars of different ages, dimensions, manufacturers, and lid types. Tools can be designed to handle inconsistencies in latches such as bent handles, missing thumb levers or severely corroded and seized parts. Bent lids with missing hinges, lids that are severely warped, lids with non-standard patterns and shapes, and jamming lids can also be handled with some embodiments of the present invention. Difficulties in opening seized and frozen lids currently require operators to use prybars and intense manual effort to open, but some embodiments of the present invention may be designed to apply enough upward force to open a lid corroded or frozen stuck. The tools may be designed to be large enough to spread forces out and avoid breaking fibreglass lids. While special designs may be necessary for round lids, the industry is moving toward longitudinal openings for dry granular products and standard round opening hatches for liquid products, which this system can also be designed to open.

Turning to FIGS. 1a to 3d, an exemplary bridge frame 10 is illustrated. The bridge frame 10 presents a simple and robust apparatus for positioning lid-opening tools, with a structure and components that are relatively easy and inexpensive to maintain. FIG. 1b shows an exemplary lattice beam structure which may be considered by the skilled person for reducing structural oscillation which may be experienced during interfacing the tool with latches. The modification may be made to cross members 14, side members 12, and supporting legs to improve overall stiffness and improve tool control.

The bridge frame 10 comprises two long side members 12 that are parallel and spaced apart, which serve as the support for the cross member 14. The side members 12 are aligned parallel to the underlying track on which the railcar passes through the facility, and in some exemplary embodiments these side members 12 may be connected to stiffening lattice structures. The cross member 14, shown in detail in FIG. 2, comprises two underhung end trucks 16. Each end truck 16 grips the bottom of the side members 12 with four wheels 13, and one servo motor drives each end truck 16 in this exemplary embodiment. The drive servo turns a shaft with one gear on it, which engages one of the two racks on the bottom of the side members 12. The four wheels on top follow, unpowered. Coordination between the servo motors is accomplished by a controller such as a programmable logic controller (not shown).

The cross member 14 comprises a toothed rack 15 on a lower surface thereof, along which the tool carriage 18 will travel. The tool carriage 18 is shown in detail in FIGS. 3a to 3d. Wheels 44 on brackets 45 guide the tool carriage 18 along the cross member 14, and toothed gears 46 (shown in FIGS. 3b to 3d) are used to move the tool carriage 18 along the toothed rack 15. This is driven by a servo motor 42 with a gearbox, and the gearbox is coupled to a shaft. The shaft has two toothed wheels on it which drive both sides of the tool carriage 18.

As can best be seen in FIGS. 3a to 3d, the tool carriage 18 retains a vertical shaft 20 which is moveable to vertically displace the tool engagement interface 22. A toothed rack 23 is provided on the side of the shaft 20, allowing it to be driven by a gear 48. A servo motor 40 drives the gear and produces the force to lift railcar lids. A shaft is used to couple the motor 40 to the gear that drives the rack 23.

A drag chain is used to hold the cable for all components of the bridge frame 10. End of Travel sensors, camera signals, motor power, encoders, brake and networking cables are all routed in the drag chain. The chain may be routed on top of the side members 12, although in some exemplary embodiments it may be located on the top of the cross member 14. A tray for the drag chain is mounted to the bottom of the cross member 14.

The basic operation of the exemplary embodiment of the present invention is illustrated in FIGS. 4a to 11, using a test mock-up lid 32. The lid 32 is secured with latches 28. The test mock-up lid 32 is designed to mimic an actual railcar lid for purposes of testing. FIG. 4b shows a test bridge frame 10 positioned over the test mock-up lid 32.

Figure 5:
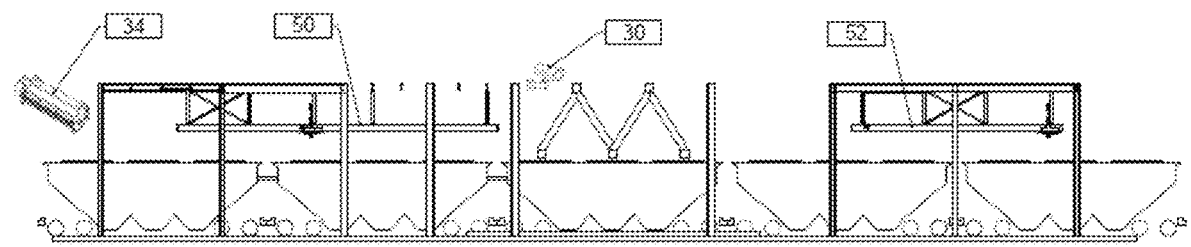
FIG. 5 is a schematic of an equipment lineup for an embodiment of the present invention.

FIG. 5 illustrates a simplified process line-up for an exemplary embodiment of the present invention. Note that this same exemplary process can be used whether the railcar is moving through the facility during the complete operation or is halted on the tracks at each stage.

When a railcar first enters the facility, cleaning will occur using a cleaning device 34. In this step, snow and debris are removed from railcars with a broom or air-curtain. A camera may be used autonomously to determine if cleaning is required. A mechanism may be used to raise and lower debris removal apparatus, as will be known to those skilled in the art. Cleaning is an important though optional stage, as having an unobstructed view of the equipment makes opening latches and lids easier for the system.

Figure 6A:
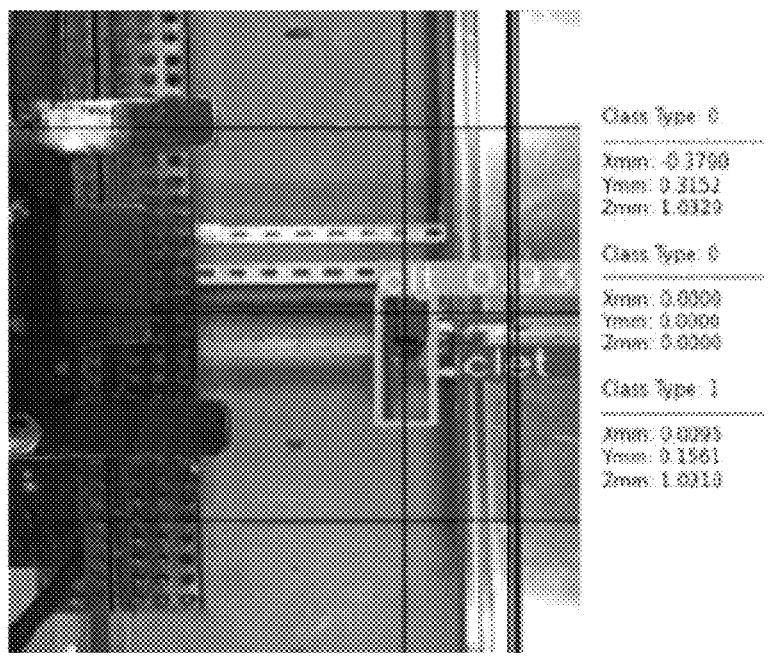
FIG. 6a shows a camera view for detection of a tool, latch and lid.

Next, the railcar will pass into a second stage where it moves through a first bridge frame 50 for disengaging of the latch and opening of the lid. The position of the tool, latches and lid extremities are identified by scanning with cameras, resulting in a map of objects within the workspace. The camera view is akin to what is shown in FIG. 6a. The map is built from realtime location data and detected objects.

Figure 6B:
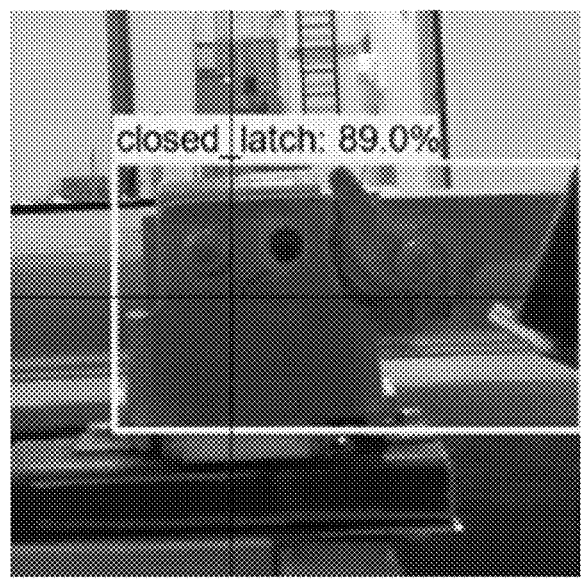
FIG. 6b shows a camera view of a closed latch for use in tool positioning.
Figure 6C:
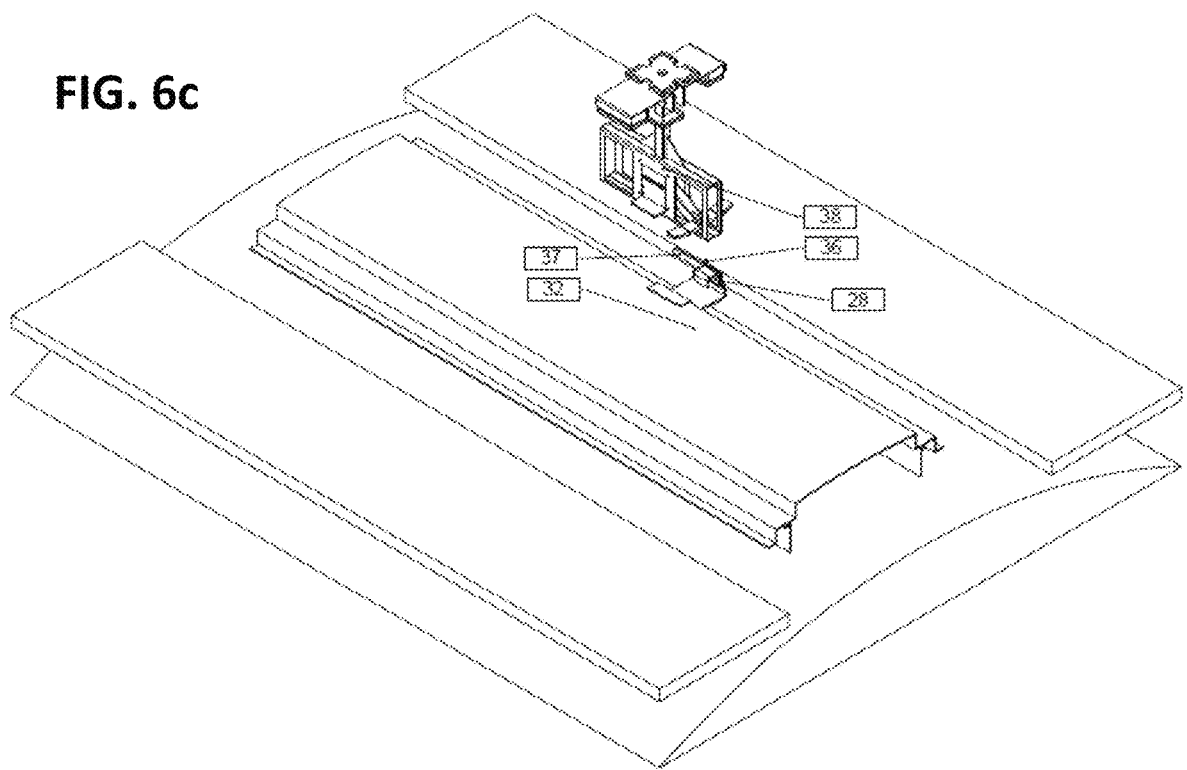
FIG. 6c is a perspective view showing a tool being aligned to disengage a latch.

The tool must then be moved to align with the latch. Recorded object position is used to guide the tool to an approximate position, as shown in FIGS. 6b and 6c. Image and depth map information may also be used to position the camera. The tool first cuts any seals if present using an appropriate toolpath. The complexity of seals may require a dynamically generated toolpath, as will be clear to one skilled in the art.

Figure 6D:
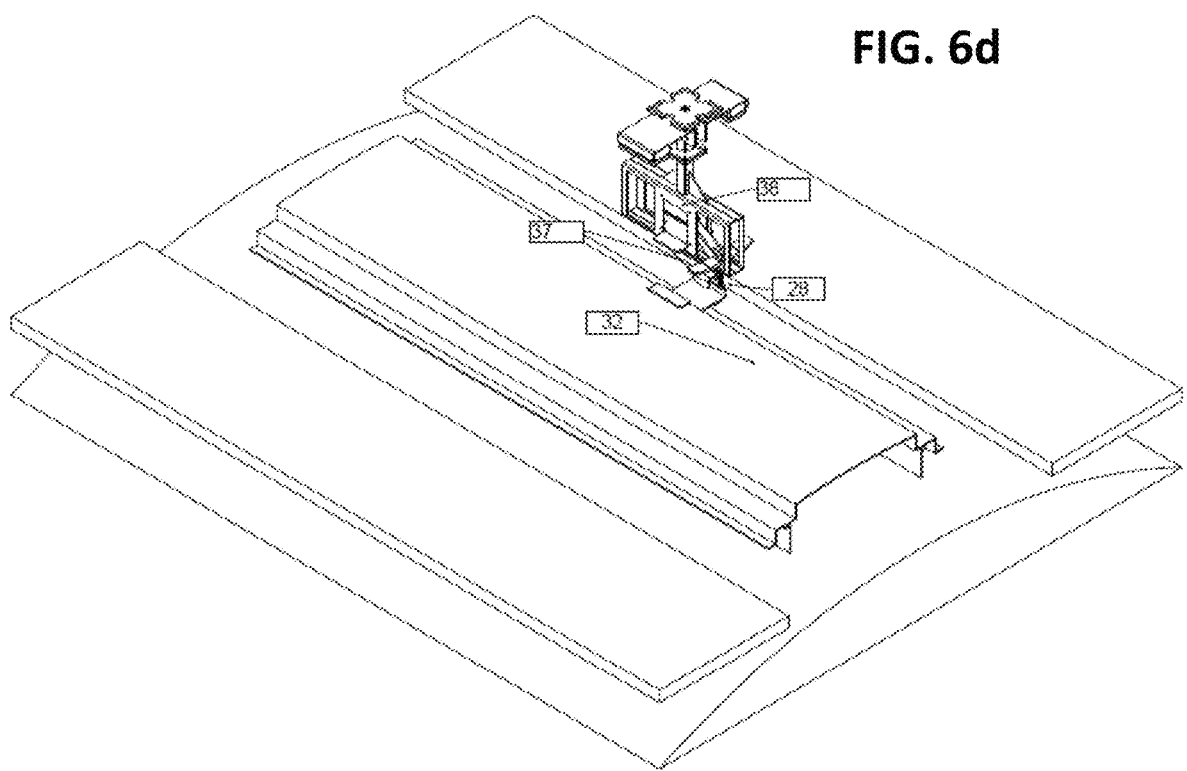
FIG. 6d is a perspective view showing the tool activating the thumb lever of the latch.
Figure 6E:
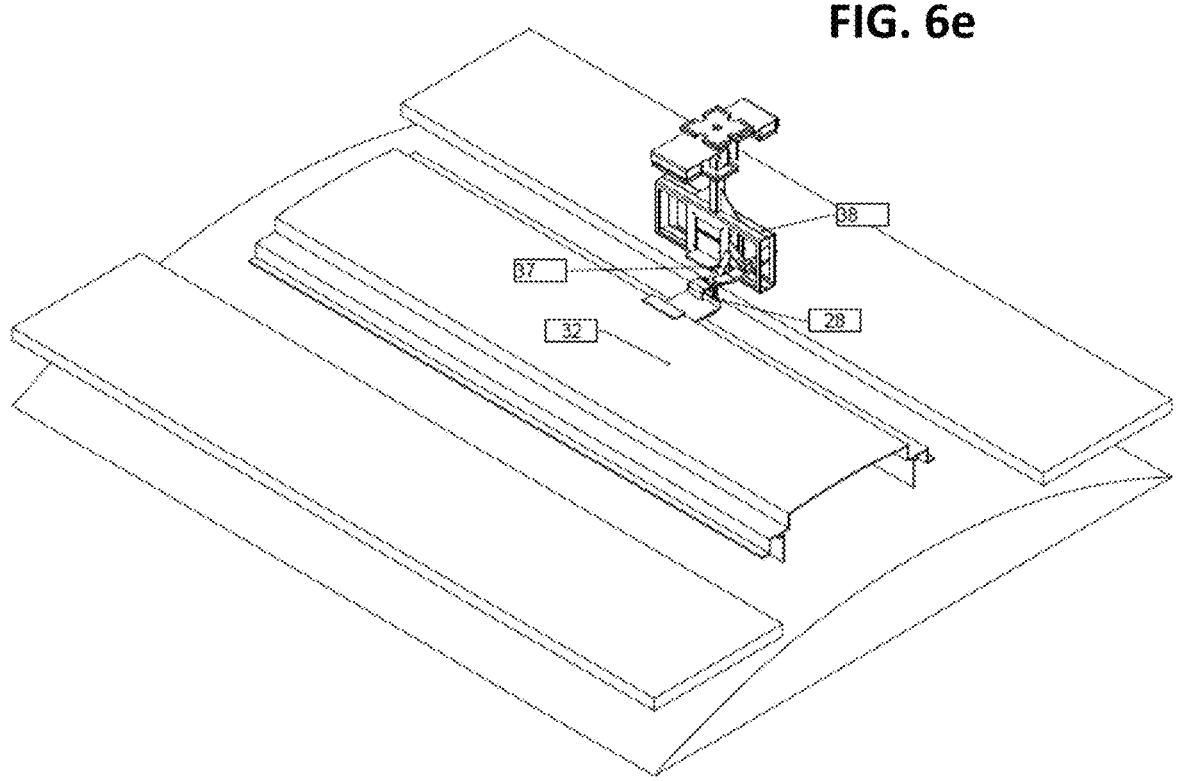
FIG. 6e is a perspective view showing the tool disengaging the latch.
Figure 6F:
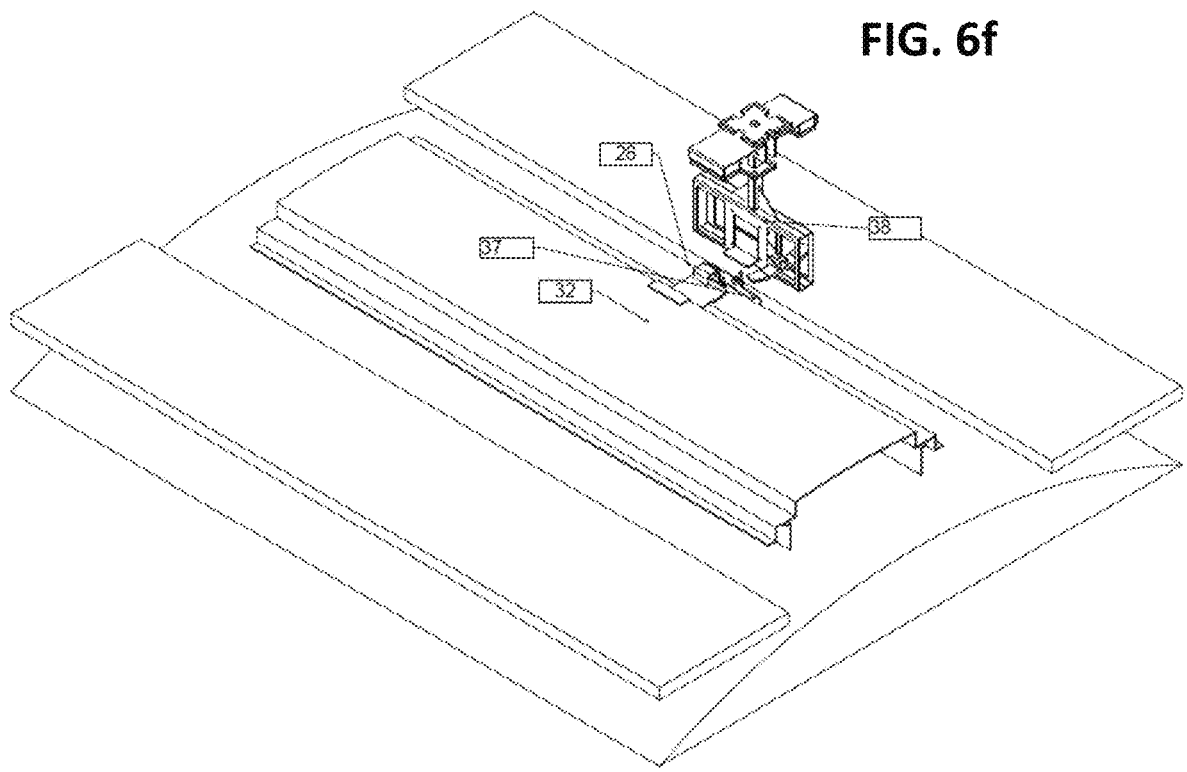
FIG. 6f is a perspective view showing the tool moving away from the lid after latch disengagement.

FIGS. 6d to 6f illustrate steps in the tool 38 disengaging the latch 28, which operation will be repeated for all latches 28 securing the target lid 32. As shown in FIG. 6d, the tool 38 is first moved to activate the thumb lever 36, which allows the handle 37 of the latch 28 to be rotated to disengage the latch 28. The thumb lever 36 is activated and held by a sliding motion. The handle 37 is flipped over by lifting and pushing in a semi-circular motion. FIG. 6e shows the tool 38 then rotating the handle 37, and the tool 38 then pulls upwardly away from the latch 28. This process is repeated with any other latches 28 securing the lid 32.

Figure 7A:
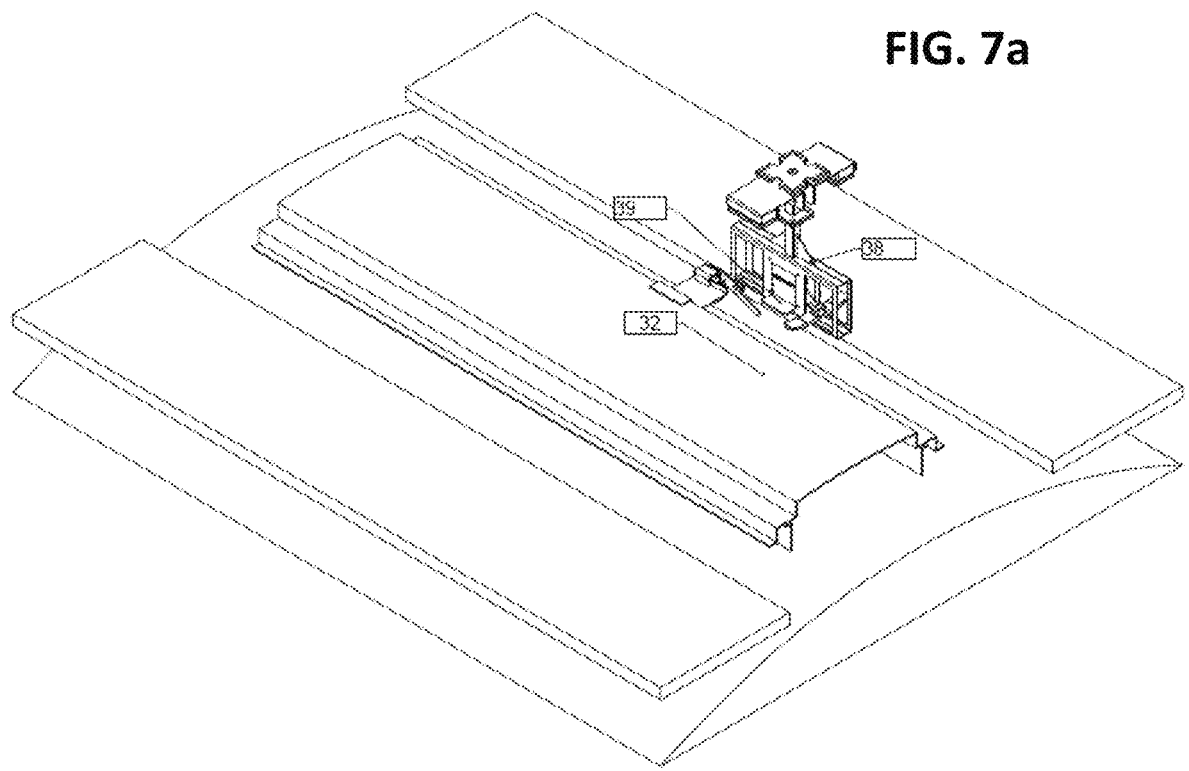
FIG. 7a is a perspective view showing a tool aligning for lid opening.
Figure 7B:
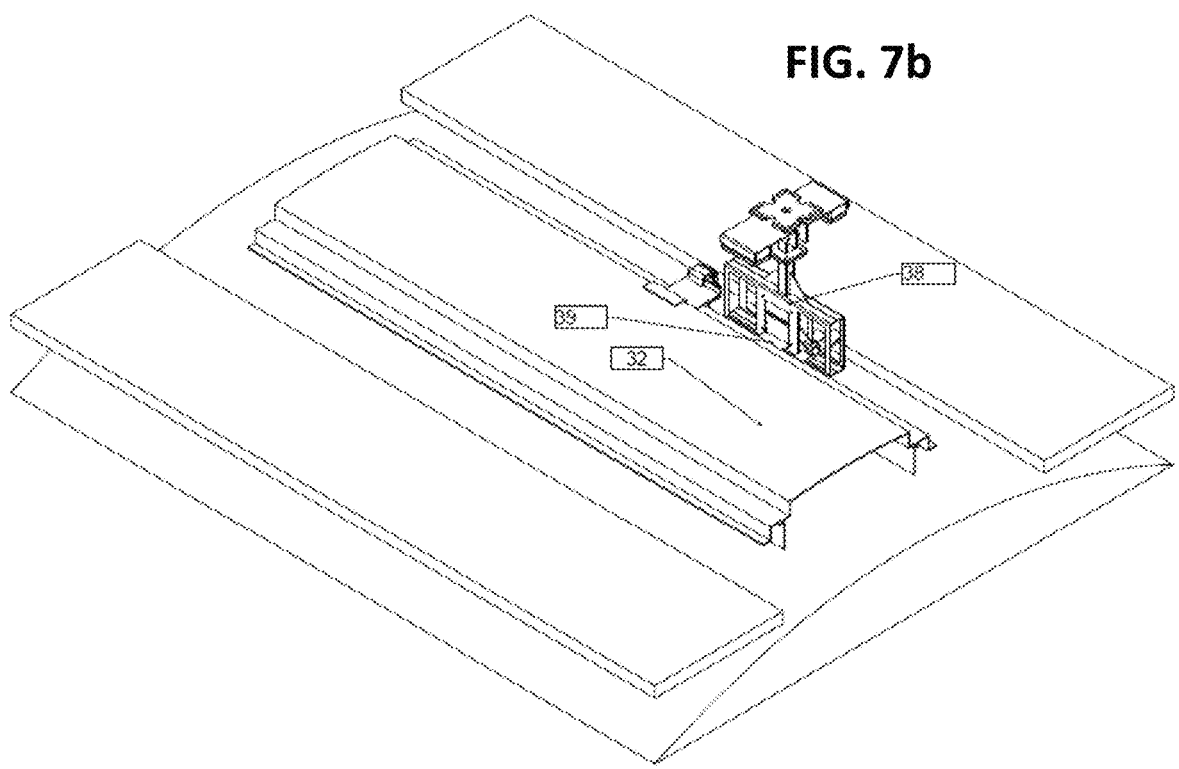
FIG. 7b is a perspective view showing the tool engaging the edge of the lid.
Figure 7C:
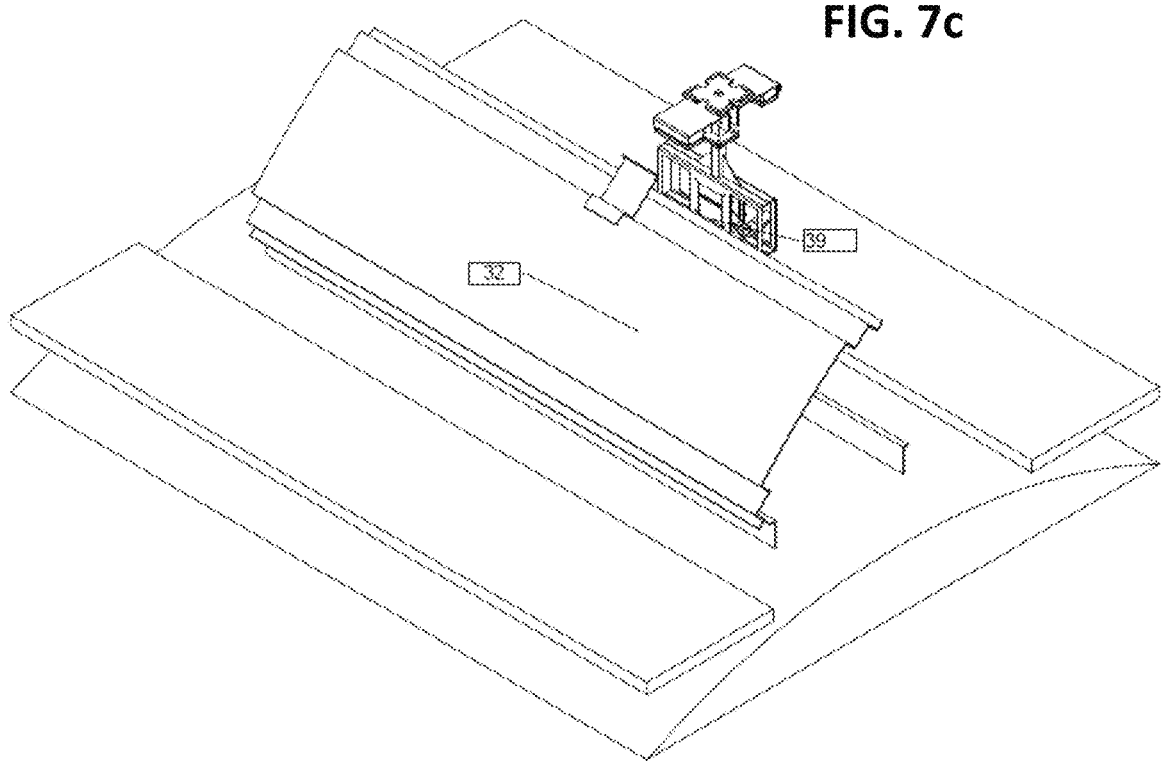
FIG. 7c is a perspective view showing the tool opening the lid.

Turning now to FIGS. 7a to 7c, the method for opening the unlatched lid 32 is illustrated. A second tool 39 is used for this operation, although it will be clear to those skilled in the art that a single tool could be designed that incorporates features of both tools 38 and 39.

First, as shown in FIG. 7a, the controller directs the tool 39 to align with the edge of the lid 32, preferably at a midpoint of the edge, which contact can be confirmed by a system camera. The tool 39 is then moved firmly against the edge of the lid 32 as shown in FIG. 7b, with a lower portion of the tool 39 inserted beneath the edge of the lid 32 to enable lifting of the lid 32. FIG. 7c then illustrates the tool 39 being moved to open the lid 32, wherein upward and sideways forces are applied using a dynamically generated path. Cameras are used to ensure the lid 32 is successfully lifted.

With the lid unlatched and lifted, the inspection device 30 as shown in FIG. 5 can be employed to inspect the railcar internal space. Railcars are inspected for debris and contamination using standard inspection equipment on a lowerable mast. The device 30 should be separate from the bridge frame 50 to improve inspection quality and the lid opening speed, and should comprise a lowerable mast with multiple cameras for 360-degree visual inspection, and the device 30 may in some embodiments be added to a tool head. The inspection camera is lowered into the railcar cavity on the device 30, and the railcar internals are illuminated with lighting attached to same mast as the camera. The device 30 captures images of the internals, and images may be processed using a convolutional neural network. Low certainty images are logged and can be used for image classification improvement. The device 30 is then removed from the railcar cavity.

Figure 8A:
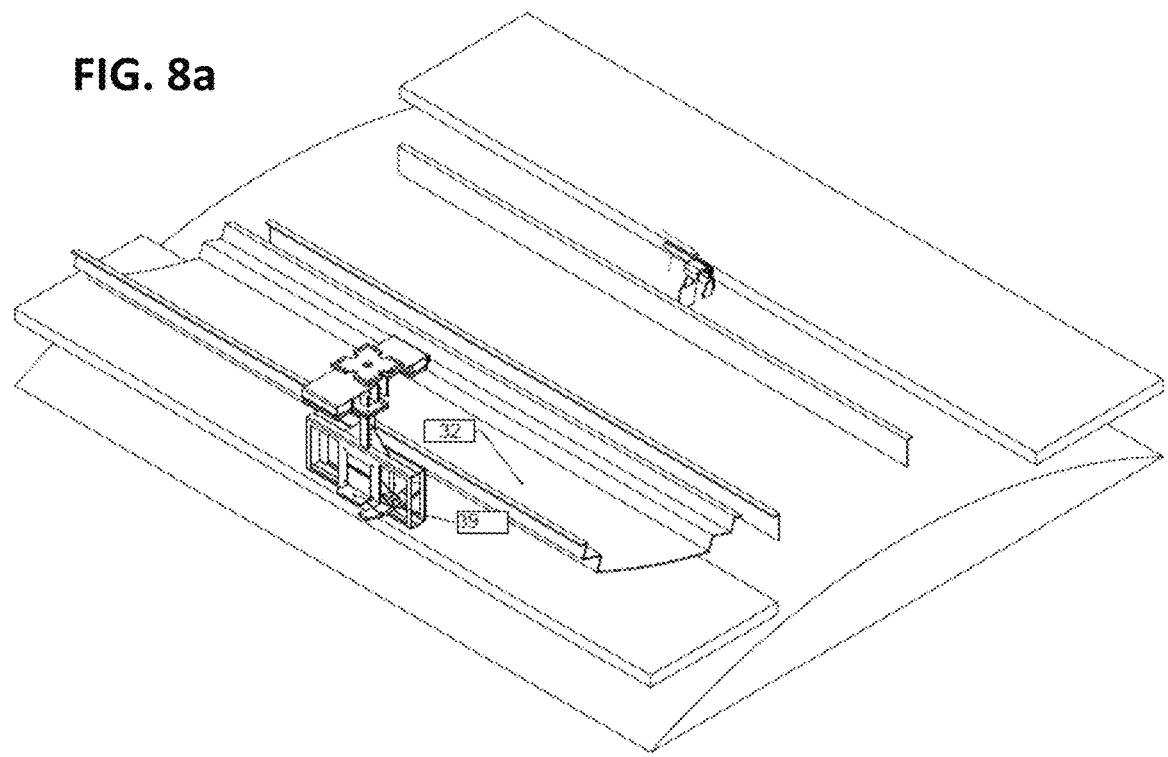
FIG. 8a is a perspective view showing a tool abutting a lid for closing of the lid.
Figure 8B:
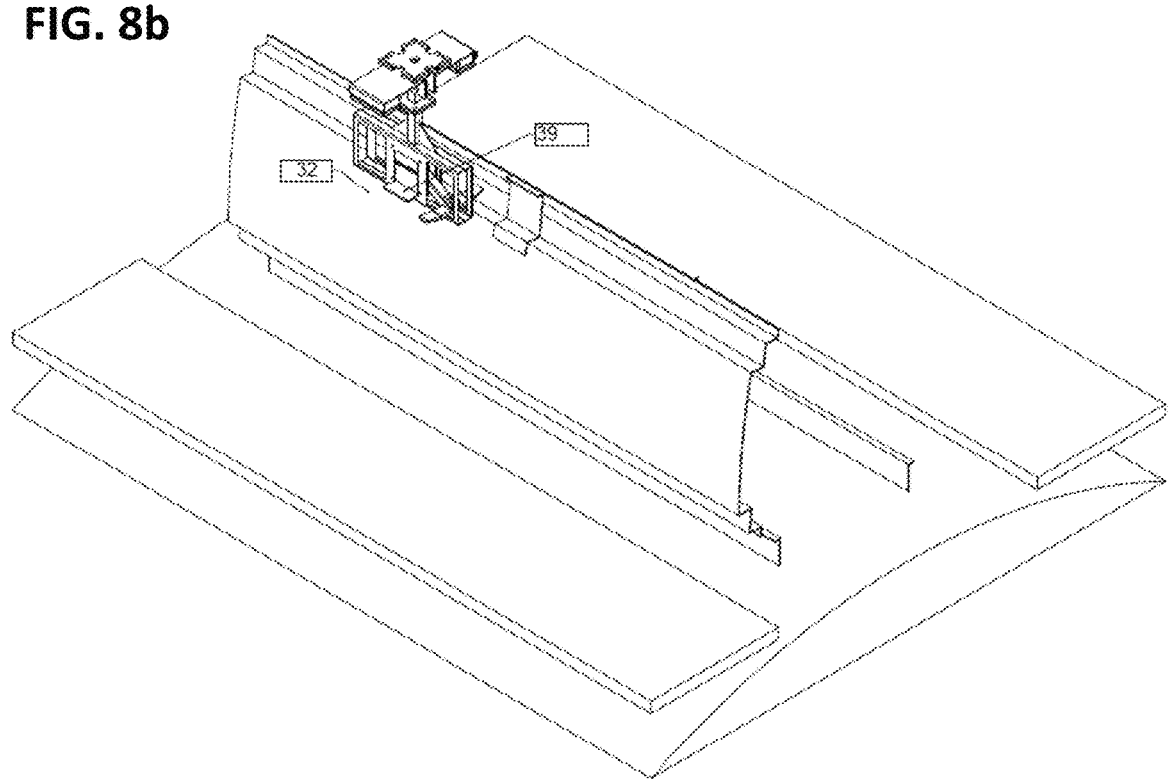
FIG. 8b is a perspective view showing the tool closing the lid.
Figure 8C:
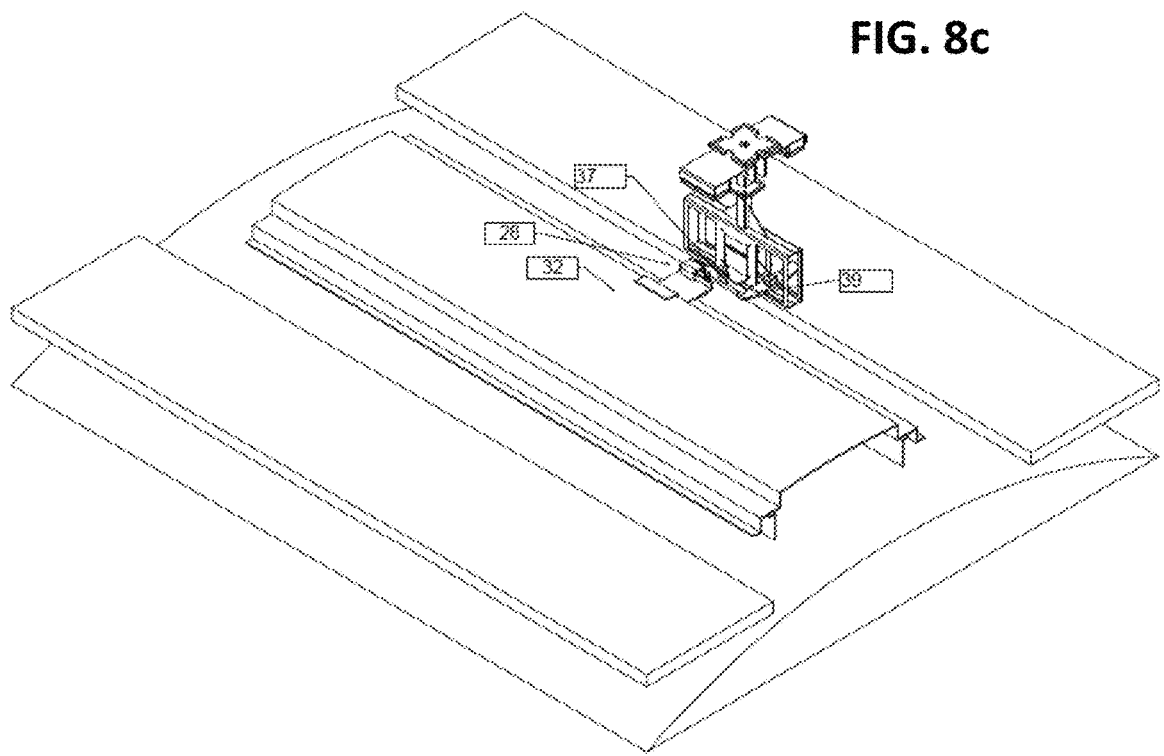
FIG. 8c is a perspective view showing the lid in a closed orientation.

Having inspected the railcar internals, the railcar can be filled and the process continues to closing and latching of the lid. Turning to FIGS. 8a to 9b, the stage is illustrated, which would take place beneath the second bridge frame 52 shown in FIG. 5. FIG. 8a shows the tool 39 being moved against the edge of the opened lid 32, with the lower portion of the tool 39 positioned underneath the edge. The tool 39 is used to lift at the center of the lid 32 and push the lid 32 over. The tool 39 can then be used to press the lid 32 down within a set torque limit if required, as shown in FIG. 8b, and FIG. 8c shows the lid 32 at the end of the closing step.

Figure 9A:
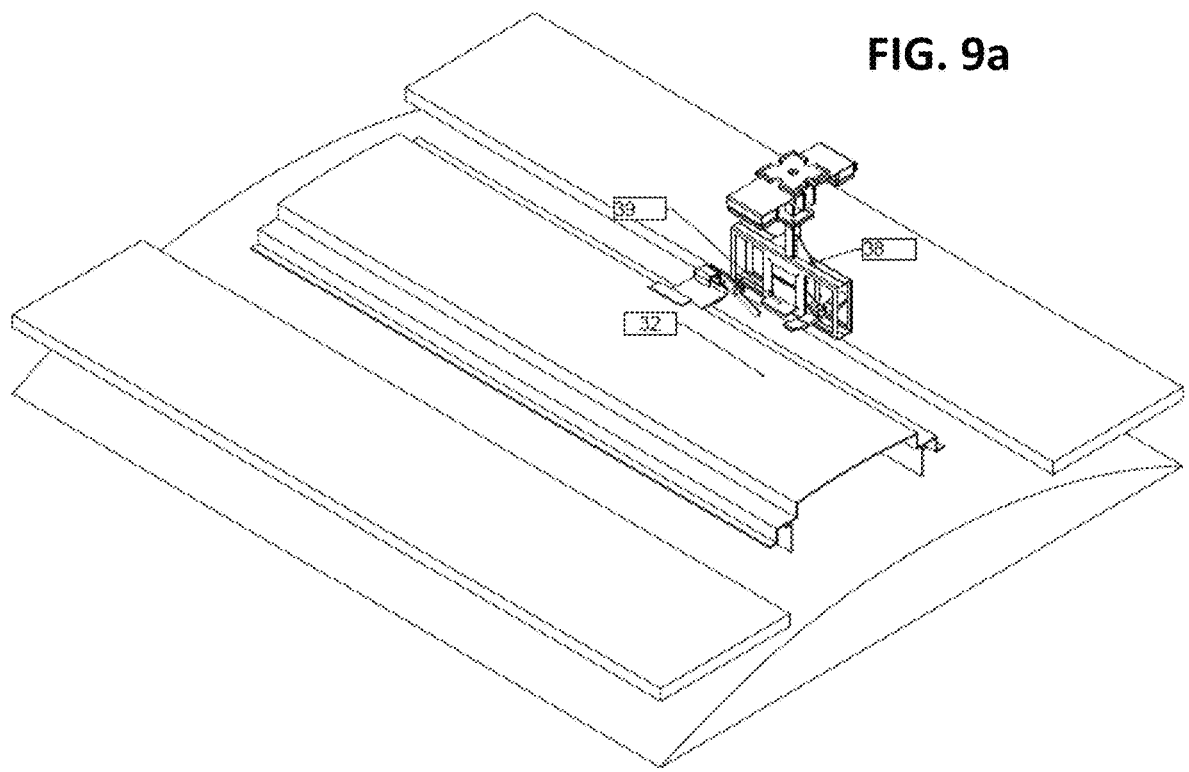
FIG. 9a is a perspective view showing a tool aligning to engage a latch after closing of the lid.
Figure 9B:
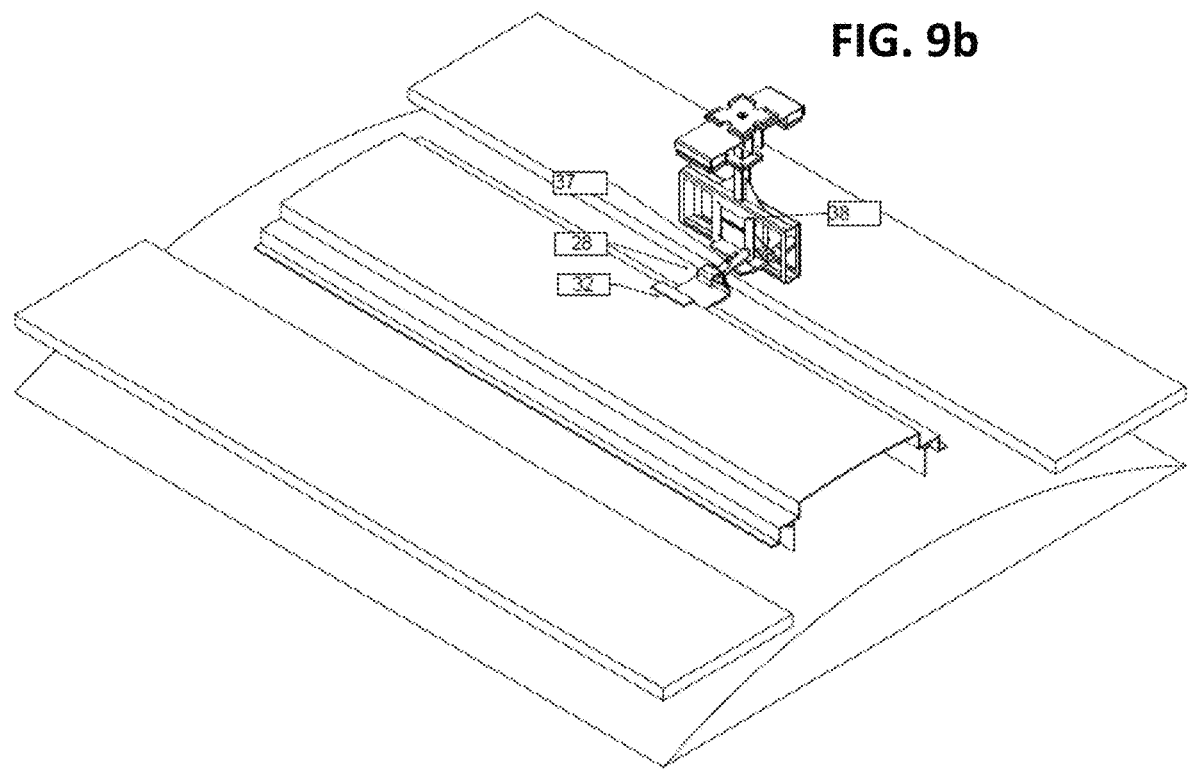
FIG. 9b is a perspective view showing the tool engaging the latch handle.

FIGS. 9a and 9b illustrate the latching of the closed lid 32. A tool 38 is moved into alignment with the latch 28, as shown in FIG. 9a, and then engages the handle 37 of the latch 28 as shown in FIG. 9b. The handle 37 is lifted with the tool 38 and pushed over, with the tool 38 pushing down against the rotated handle 37 if necessary to fully engage the latch. This is repeated with any other latches securing the lid 32.

Cameras in this exemplary system are used as multipurpose sensors. Two cameras are used per bridge frame to navigate, provide encoder feedback, and calibrate movements. During operation, the cameras are used to detect objects and with regression models to rapidly detect the train speed. This information is used to improve object position tracking and improve bridge frame positioning for motion tasks.

Figure 10:
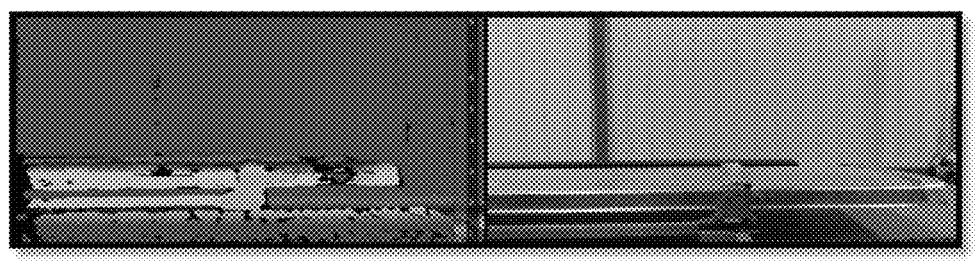
FIG. 10 is a picture showing a lid and corresponding depth map imagery.

A three-dimensional camera which uses RGB images with depth mapping lasers or lidar will be used for fine movements. A fine movement is a relative movement made with respect to detected objects. FIG. 10 illustrates depth-map imagery to use in fine movements. This camera will be used to detect the following objects:

Open latch
Closed latch
Lid edge
Seal
Open end strap
Closed end strap

Locations of objects dictate the movements made by the system. A combination of pre-programmed moves, neural network guidance, and logically calculated moves are used to open or closed lids as required. Moves are verified against both cameras.

The cameras and related protocols used in this exemplary embodiment are selectable by the skilled person to provide high quality, low-latency real time images. This configuration produces good results for object detection and image classification. To accommodate cable length restrictions in this system, specialized computers are preferably mounted on the tool interface. Locating the computer on the tool may enable use of low latency depth sensing cameras.

Tools are wear-points. Depending on duty cycle, tools may need to be replaced in as few as five years. An exemplary tool attachment point, mount, and tool end are now described. The tool is designed in such a way that no power is required at the tool end and allows tools to be easily replaced. A flange 75 at the bottom of the vertical axis allows tools to be easily changed and replaced as required. Tools bolt to the flange, requiring operator intervention.

A tool for opening latches is required. To open a latch, the thumb lever 36 is actuated, then the handle is simultaneously lifted and rotated. The tool attachment does not rotate, but rather induces the handle to rotate by lifting it like a lever.

Figure 11:
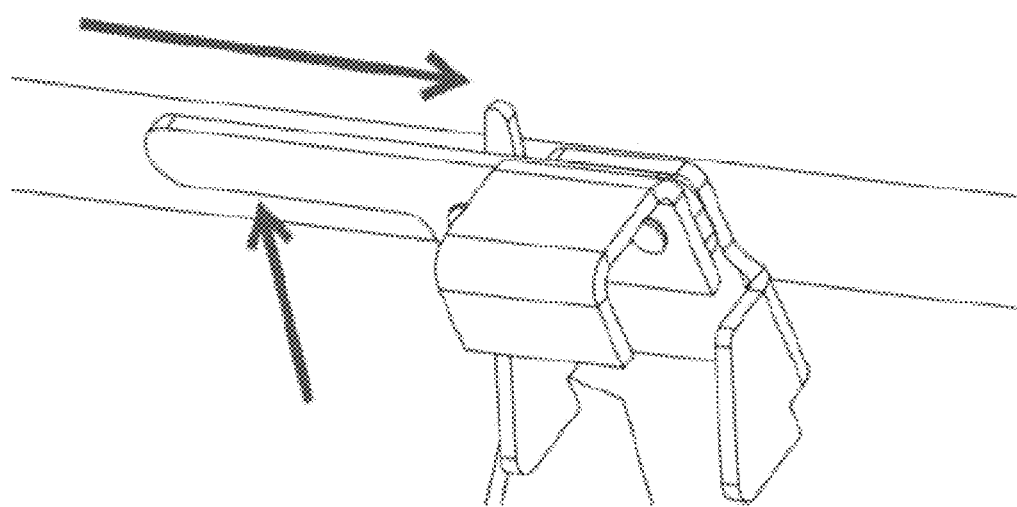
FIG. 11 is a perspective view showing forces required to open a latch.

FIG. 11 shows the forces required to disengage a latch. A tool is designed for handles pointed in a uniform direction and on the same side of the railcar. If railcars approach from different directions or have handles on the opposite side of the railcar, the tool is to be removed and replaced with one that is correctly oriented; alternatively, a bi-directional tool may be employed for this purpose.

The ability to change tools on one gantry frame reduces the need for many gantry frames with a single tool. The exemplary tool connection flange allows specialized tools to be used on the intelligent bridge crane. Specialized tool ends may be developed for opening handles, opening lids, lifting lids, cutting seals or installing seals, or taking grain samples, railcar inspections, lubrication of lid gaskets, or application of inoculants and anti-microbial chemical sprays for example. These will be connected at the bottom of the shaft 20.

Figure 12:
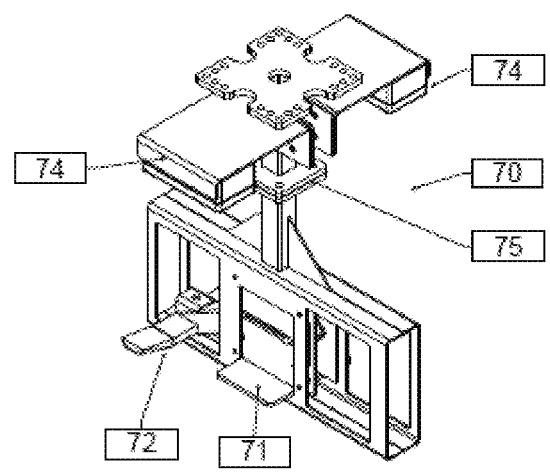
FIG. 12 is a perspective view of a first exemplary tool.
Figure 13:
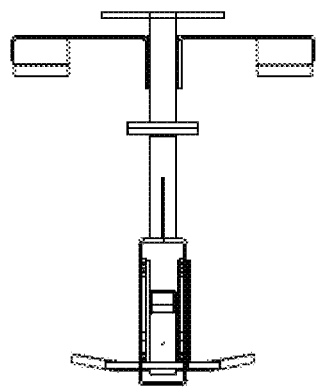
FIG. 13 is a perspective view of a second exemplary tool.

FIG. 12 shows an exemplary tool 70 comprising a flat bar 71 for lifting a lid, which uses a precision toolpath to ensure the lid does not slip out. Sensors can be incorporated for confirming contact with the lid edge, two actuation points 72 on a plate to activate the thumb lever on a latch and actuate the latch handle (again, sensors can be incorporated for confirming handle position), an offset camera mount 74 for fine detail observations, and safe breakaway point 75 in case the tool hits an object.

The exemplary tool uses a floating actuation point 72 to maintain pressure on the thumb lever 36 and keep the thumb lever 36 engaged throughout the opening sequence. The actuation point moves upward and forward to compensate for overshoot and positional inaccuracies where upward correlates with altitude, and forward and backward are in the direction of train motion. It does not move in the side-to side (cross-track) direction, nor does it rotate when lifting or experiencing side loading. This tool embodiment compensates for flexure in the side members 12, which may cause position error in the cross rail and vertical directions. It also compensates for position-setpoint overshoot caused when using undersized motors. The floating actuation point fits a wide range of handle shape variations, and reduces the need for powered actuators.

The tool uses a second floating actuation point, mirrored on the other side of the tool to accommodate railcars with latches on either side of the lid. The tool may be designed to operate on both sides of the lid, but this will require sensing such as with a camera to detect that both sides of the lid are latched before one side is opened.

Some exemplary embodiments of the present invention use AI and machine learning techniques to improve operation, particularly for automated stages. In some embodiments, the system logs and rates its attempts at opening/closing railcar latches and lids. When enough new data is collected the system re-trains for continuous improvement of the system. Reinforcement learning differentiates this system from some existing automated systems. Small, randomized differences may be introduced with each task to ensure incremental improvements are made. The system is re-trained using the best rated operations. This leads to a system that is continually improving and becomes more efficient with time.

Machine learning implementations may use a numpy.poly1d library for regression models, and neural networks such as TensorFlow™, CNN, and object detection libraries.

Computer Vision may be used for measuring object location in physical space. Distance of objects along the railway is measured using depth camera readings and servo motor positions. A high refresh rate with extremely low latency is required for real-time navigation of moving objects. Object information is read many times per second.

Machine learning may also be used for velocity. Velocity of detected objects is calculated from object positions. A regression model is used to predict object locations based on change in time and change in position.

Deep learning may be used for tool path navigation optimization. A neural network can be created to make the best toolpath. Data collected from the quickest and most efficient lid opening (manual and automatic) are fed into the model for training. The data is timeseries data logged in a database. This data is text-based lid and latch position information with movement information. The neural network learns to choose movement based on orientation of all other objects. The directions may be any of the 6 cardinal directions in the coordinate system (i.e., X, Y, Z).

Deep learning can also be used for image classification. Image classification yields good toolpaths for opening/closing lids and latches. Images are captured and labelled. The model can be used for object detection with object categories including open lid, closed lid, open latch, closed latch, tool, presence of latch seal, and closed lid edge. Pictures of each of these object categories are collected and labelled. The neural network is trained to recognize these objects. If objects are found that are not correctly identified, pictures of that object are labelled and added to the dataset for training.

Deep reinforcement learning (DRL) provides an opportunity for continuous improvement of the operations. An optimal toolpath is generated through an on-policy or off-policy Markov Decision Process using DRL. In training the DRL network, the toolpath generated has periodic random values. The random values added to the path present opportunities to improve or get a worse toolpath and be rewarded as such. A set of criteria (time, number of moves, latch opening success, lid opening success, etc.) are used to grade each attempt through rewards. Many attempts to open latches can be run in a test environment of while online in an actual environment. The attempts with the highest reward can be used to re-train the DRL neural network for continuous improvement of the optimal toolpath.

Once the DRL neural network model is trained, test runs are made to see if it performs better than the original model. If key performance indicators show it is better, the new model is kept for use, and the old model is discarded.

Exemplary implementations of systems according to the present invention can take two modes of operation: automated and standby/off. A home button can be provided to move the tool to an out-of-the-way waiting position. In automated mode, the control computer drives the bridge frame movements completely automatically. Directions can be based on camera feedback and precisely trained neural networks. No operator input is required. In this mode, the system will exit automated mode when safety barriers are breached, such as including for example the tool head disengages and backs away or freezes in position, where for example railcars are interlocked and a coast-down effect between two systems might result in equipment damage. In standby mode, the system does not perform any motion. The power is not off, but this is not an interlock. Locking out equipment and using physical barriers and disconnecting power to prevent system motion is required to perform maintenance on this system.

It will be clear to those skilled in the art that embodiments according to the present invention may present a number of advantages over the prior art. For example, the bridge structure is a relatively simple apparatus, easy and inexpensive to repair and maintain, and does not require specialist maintenance staff or hard-to-procure replacement components. The present invention is also highly adaptable to specialized tools, with complex toolpaths enabled by commands from the programmable logic controller.

The foregoing is considered as illustrative only of the principles of the present invention. The scope of the claims should not be limited by the exemplary embodiments set forth in the foregoing, but should be given the broadest interpretation consistent with the specification as a whole.

The invention claimed is:

1. A system for operating a lid of a railcar, the railcar positioned on rail tracks for movement therealong, the system comprising:
 a bridge frame comprising two parallel spaced-apart side members, the side members parallel to the rail tracks and laterally spaced from the lid, the bridge frame sized and configured to receive the railcar beneath and between the side members;
 a cross member between and engaging the side members and perpendicular to the side members and selectively moveable therealong in a direction parallel to the side members, the cross member configured for movement with the railcar as the railcar moves along the rail tracks, such that the cross member is moveable over any part of the lid as the railcar moves along the rail tracks under the bridge frame;
 a tool carriage engaging the cross member and selectively moveable therealong in a direction perpendicular to the side members, the tool carriage comprising a rigid and selectively vertically moveable shaft comprising a tool engagement interface, the shaft comprising a rack configured for operable engagement with a gear on the tool carriage to vertically move the shaft and the tool engagement interface; and
 a tool configured for receipt and rigid retention by the tool engagement interface, the tool configured to engage and operate the lid of the railcar;
 such that the tool can be selectively positioned in any of a plurality of locations relative to the lid of the railcar by movement of one or more of the cross member, the tool carriage, the shaft and the tool engagement interface, and the tool thereby moveable with the lid for the operating of the lid as the railcar moves along the rail tracks under the bridge frame.

2. The system of claim 1 wherein the cross member comprises two paired cross members configured to receive the tool carriage therebetween.

3. The system of claim 1 wherein the tool is configured to open the lid, close the lid, or both open and close the lid.

4. The system of claim 3 wherein the tool is configured to engage the lid when the lid is in an opened or closed orientation.

5. The system of claim 1 wherein the lid of the railcar is secured with a latch, the tool configured to disengage the latch, engage the latch, or both disengage and engage the latch.

6. The system of claim 5 wherein the latch is secured with a seal, the system further comprising a tool for removing the seal.

7. The system of claim 5 wherein the tool is configured to push against the latch to engage the latch.

8. The system of claim 1 further comprising a controller for executing commands to instruct movement of the cross member, the tool carriage and the tool engagement interface to selectively position the tool at a lid engagement location.

9. The system of claim 8 further comprising at least one location sensor for detecting a location of the lid in three-dimensional space, the at least one location sensor configured to send a lid location signal to help generate the commands executed by the controller.

10. The system of claim 9 further comprising at least one camera for detecting a moving speed of the lid when the railcar is in motion, the at least one camera configured to send a lid position and timestamp signal to help calculate velocity and thus help generate the commands executed by the controller.

11. The system of claim 8 wherein the tool follows a dynamic toolpath adjusted for velocity of the lid to operate the lid, the controller configured to execute commands to instruct movement of the cross member, the tool carriage and the tool engagement interface to move the tool along the dynamic toolpath.

12. The system of claim 8 further comprising machine learning functionality to learn from past operating of the lid to improve future operating of the lid.

13. The system of claim 1 further comprising a cleaning device for cleaning snow or debris from the lid of the railcar prior to the operating of the lid.

14. The system of claim 1 further comprising a sampling device lowerable into an interior of the railcar when the lid has been opened by the tool.

15. The system of claim 1 comprising a plurality of tools of differing functionality, the tool engagement interface configured for selective engagement with and disengagement from each of the plurality of tools.

16. The system of claim 1 wherein the two parallel spaced-apart side members are reinforced or supported to reduce structural deflection.

17. The system of claim 1 wherein the cross member engages undersides of the side members.

18. The system of claim 1 wherein the railcar moves along the rail tracks in either direction.

19. The system of claim 1 wherein rigidity of the rigid and selectively vertically moveable tool engagement interface allows for the tool to be precisely positioned in any of the plurality of locations.

20. A system for opening and closing a lid of a railcar, the railcar positioned on rail tracks for movement therealong, the system comprising:
   first and second bridge frames in parallel spaced-apart alignment, each of the first and second bridge frames comprising:
      two parallel spaced-apart side members, the side members parallel to the rail tracks and laterally spaced from the lid, the bridge frame sized and configured to receive the railcar beneath and between the side members;
      a cross member between and engaging the side members and perpendicular to the side members and selectively moveable therealong in a direction parallel to the side members, the cross member configured for movement with the railcar as the railcar moves along the rail tracks, such that the cross member is moveable over any part of the lid as the railcar moves along the rail tracks under the bridge frame;
      a tool carriage engaging the cross member and selectively moveable therealong in a direction perpendicular to the side members, the tool carriage comprising a rigid and selectively vertically moveable shaft comprising a tool engagement interface, the shaft comprising a rack configured for operable engagement with a gear on the tool carriage to vertically move the shaft and the tool engagement interface; and
      a tool configured for receipt and rigid retention by the tool engagement interface, the tool configured to engage and operate the lid of the railcar, such that the tool can be selectively positioned in any of a plurality of locations relative to the lid of the railcar by movement of one or more of the cross member, the tool carriage, the shaft and the tool engagement interface, and the tool thereby moveable with the lid for the operating of the lid as the railcar moves along the rail tracks under the bridge frame;
      the tool on the first bridge frame configured for opening the lid; and
      the tool on the second bridge frame configured for closing the lid.

21. The system of claim 20 wherein the cross member comprises two paired cross members configured to receive the tool carriage therebetween.

22. The system of claim 20 wherein the lid of the railcar is secured with a latch, the tool on the first bridge frame configured to disengage the latch to enable the opening of the lid, and the tool on the second bridge frame configured to engage the latch after the closing of the lid.

23. The system of claim 22 wherein the latch is secured with a seal, the system further comprising a tool for removing the seal before the disengaging of the latch.

24. The system of claim 20 further comprising a controller for executing commands to instruct movement of the cross members, the tool carriages and the tool engagement interfaces to selectively position the tools at a lid engagement location.

25. The system of claim 24 further comprising at least one location sensor for detecting a location of the lid in three-dimensional space, the at least one location sensor configured to send a lid location signal to help generate the commands for the controller.

26. The system of claim 25 further comprising at least one velocity sensor for detecting a moving speed of the lid when the railcar is in motion, the at least one velocity sensor configured to send a lid velocity signal to help generate the commands executed by the controller.

27. The system of claim 24 wherein the tool follows a dynamic toolpath to open or close the lid, the controller configured to execute commands to instruct movement of the cross member, the tool carriage and the tool engagement interface to move the tool along the dynamic tool path.

28. The system of claim 24 further comprising machine learning functionality to learn from past opening and closing of the lid to improve future opening and closing of the lid.

29. The system of claim 20 further comprising a cleaning device for cleaning snow or debris from the lid of the railcar prior to the opening of the lid.

30. The system of claim 20 further comprising a sampling device lowerable into an interior of the railcar when the lid has been opened by the tool.

31. The system of claim 20 comprising a plurality of tools of differing functionality, the tool engagement interface configured for selective engagement with and disengagement from each of the plurality of tools.

32. The system of claim 20 wherein the two parallel spaced-apart side members are reinforced or supported to reduce structural deflection.

33. A method for operating a lid of a railcar, the railcar positioned on rail tracks for movement therealong, the method comprising the steps of:

a. providing a bridge frame comprising side members parallel to the rail tracks and laterally spaced from the lid, a cross member between and engaging the side members and perpendicular to the side members and moveable therealong such that the cross member is moveable with the railcar and thus moveable over any part of the lid as the railcar moves along the rail tracks under the bridge frame, a tool carriage engaging the cross member and moveable therealong, the tool carriage comprising a rigid and vertically moveable shaft comprising a tool engagement interface rigidly retaining a tool configured to engage and operate the lid of the railcar, the shaft comprising a rack configured for operable engagement with a gear on the tool carriage to vertically move the shaft and the tool engagement interface, such that the tool can be positioned in any of a plurality of locations relative to the lid of the railcar by movement of one or more of the cross member, the tool carriage, and the tool engagement interface, the shaft and the tool thereby moveable with the lid for the operating of the lid as the railcar moves along the rail tracks under the bridge frame;

b. moving the railcar between the side members;

c. by moving the cross member, the tool carriage and the tool engagement interface, locating the tool adjacent the lid; and d. manipulating the tool to engage the lid to operate the lid.

34. The method of claim 33 wherein a controller is used for the steps of moving the cross member, the tool carriage and the tool engagement interface to locate the tool adjacent the lid and for manipulating the tool to engage the lid to operate the lid.

35. The method of claim 34 wherein the controller is used to direct the tool along a dynamic toolpath to open the lid.

36. The method of claim 34 comprising the further steps after step d. of assessing the manipulating of the tool and determining improvements to the manipulating of the tool by machine learning for future use of the tool.

37. The method of claim 33 further comprising the step before step c. of sensing a location of the lid to enable the engaging of the lid by the tool.

38. The method of claim 37 further comprising the step before step c. of sensing a velocity of the lid to enable the engaging of the lid by the tool.

39. The method of claim 33 further comprising the step before step c. of cleaning the lid.

40. The method of claim 33 wherein the lid is secured with at least one latch, the method comprising the step before step d. of using the tool to disengage the latch.

41. The method of claim 40 wherein the latch is secured with a seal, the method comprising the step of removing the seal before the step of disengaging the latch.

42. The method of claim 33 further comprising the step after step d. of lowering a sampling device into an interior of the rail car.

43. The method of claim 33 wherein the tool is a plurality of tools each having differing functionality, the method comprising the step before step c. of selecting one of the plurality of tools based on functionality.

44. The method of claim 33 comprising the step of providing a second bridge frame, wherein the tool on the bridge frame is used to open the lid and a tool on the second bridge frame is used to close the lid.

45. The method of claim 33 further comprising reinforcing or supporting the side members of the bridge frame to reduce structural deflection.

46. A system for operating a lid of a railcar, the railcar positioned on rail tracks for movement therealong, the system comprising:

at least one support member, the at least one support member parallel to the rail tracks;

a cross member engaging the at least one support member and perpendicular thereto and selectively moveable therealong in a direction parallel to the at least one support member, the cross member configured for movement with the railcar as the railcar moves along the rail tracks, such that the cross member is moveable over any part of the lid as the railcar moves along the rail tracks; and a tool carriage engaging the cross member and selectively moveable therealong in a direction perpendicular to the at least one support member, the tool carriage rigidly supporting a vertically moveable shaft comprising a tool configured to engage and operate the lid of the railcar, the shaft comprising a rack configured for operable engagement with a gear on the tool carriage to vertically move the shaft and the tool;

such that the tool can be selectively positioned in any of a plurality of locations relative to the lid of the railcar by movement of the cross member and/or the tool carriage, and the shaft and the tool thereby moveable with the lid for the operating of the lid as the railcar moves along the rail tracks.

47. The system of claim 46 wherein the cross member comprises two paired cross members configured to receive the tool carriage therebetween.

48. The system of claim 46 wherein the tool is configured to open the lid, close the lid, or both open and close the lid.

49. The system of claim 46 wherein the lid of the railcar is secured with a latch, the tool configured to disengage the latch, engage the latch, or both disengage and engage the latch.

50. The system of claim 49 wherein the latch is secured with a seal, the system further comprising a tool for removing the seal.

51. The system of claim 46 further comprising a controller for executing commands to instruct movement of the cross member, the tool carriage and the tool engagement interface to selectively position the tool at a lid engagement location.

52. The system of claim 51 further comprising at least one location sensor for detecting a location of the lid in three-dimensional space, the at least one location sensor configured to send a lid location signal to help generate the commands executed by the controller.

53. The system of claim 52 further comprising at least one camera for detecting a moving speed of the lid when the railcar is in motion, the at least one camera configured to send a lid position and timestamp signal to help calculate velocity and thus help generate the commands executed by the controller.

54. The system of claim 51 wherein the tool follows a dynamic toolpath adjusted for velocity of the lid to operate the lid, the controller configured to execute commands to instruct movement of the cross member, the tool carriage and the tool engagement interface to move the tool along the dynamic toolpath.

55. The system of claim 51 further comprising machine learning functionality to learn from past operating of the lid to improve future operating of the lid.

56. The system of claim 46 further comprising a cleaning device for cleaning snow or debris from the lid of the railcar prior to the operating of the lid.

57. The system of claim 46 further comprising a sampling device lowerable into an interior of the railcar when the lid has been opened by the tool.

58. The system of claim 46 comprising a plurality of tools of differing functionality, the tool engagement interface configured for selective engagement with and disengagement from each of the plurality of tools.

59. The system of claim 46 wherein the at least one support member is reinforced or supported to reduce structural deflection.

60. A system for operating a lid of a railcar, the railcar positioned on rail tracks for movement therealong, the system comprising:
  a bridge frame comprising two parallel spaced-apart side members;
  a cross member between and engaging the side members and selectively moveable therealong the cross member configured for movement with the railcar as the railcar moves along the rail tracks;
  a tool carriage engaging the cross member and selectively moveable therealong, the tool carriage comprising a shaft, the shaft comprising a rack configured for operable engagement with a gear on the tool carriage to vertically move the shaft; and
  a tool configured for receipt and retention by the shaft, the tool configured to engage and operate the lid of the railcar;
  such that the tool can be selectively positioned in any of a plurality of locations relative to the lid of the railcar by movement of one or more of the cross member, the tool carriage and the shaft, and the tool thereby moveable with the lid for the operating of the lid as the railcar moves along the rail tracks under the bridge frame.

61. The system of claim 60 wherein the cross member comprises two paired cross members configured to receive the tool carriage therebetween.

62. The system of claim 60 wherein the tool is configured to open the lid, close the lid, or both open and close the lid.

63. The system of claim 60 wherein the lid of the railcar is secured with a latch, the tool configured to disengage the latch, engage the latch, or both disengage and engage the latch.

64. The system of claim 63 wherein the latch is secured with a seal, the system further comprising a tool for removing the seal.

65. The system of claim 60 further comprising a controller for executing commands to instruct movement of the cross member, the tool carriage and the shaft to selectively position the tool at a lid engagement location.

66. The system of claim 65 further comprising at least one location sensor for detecting a location of the lid in three-dimensional space, the at least one location sensor configured to send a lid location signal to help generate the commands executed by the controller.

67. The system of claim 66 further comprising at least one camera for detecting a moving speed of the lid when the railcar is in motion, the at least one camera configured to send a lid position and timestamp signal to help calculate velocity and thus help generate the commands executed by the controller.

68. The system of claim 65 wherein the tool follows a dynamic toolpath adjusted for velocity of the lid to operate the lid, the controller configured to execute commands to instruct movement of the cross member, the tool carriage and the shaft to move the tool along the dynamic toolpath.

69. The system of claim 65 further comprising machine learning functionality to learn from past operating of the lid to improve future operating of the lid.

70. The system of claim 60 further comprising a cleaning device for cleaning snow or debris from the lid of the railcar prior to the operating of the lid.

71. The system of claim 60 further comprising a sampling device lowerable into an interior of the railcar when the lid has been opened by the tool.

72. The system of claim 60 comprising a plurality of tools of differing functionality, the shaft configured for selective engagement with and disengagement from each of the plurality of tools.

73. The system of claim 60 wherein the two parallel spaced-apart side members are reinforced or supported to reduce structural deflection.

74. The system of claim 60 wherein the shaft is vertically oriented and has a vertical long axis, and the shaft is moveable only parallel the vertical long axis.

75. A method for positioning a tool to manipulate a lid of a railcar as the railcar moves along rail tracks, the method comprising the steps of:
  a. determining a location of the lid and defining a manipulation point on the lid using a coordinate system, the coordinate system comprising a horizontal axis, a lateral axis, and a vertical axis, such that the manipulation point is defined collectively by a point on the horizontal axis, a point on the lateral axis, and a point on the vertical axis;
  b. providing a cross member configured for movement with and above the railcar along the rail tracks in a direction of travel parallel the horizontal axis, a tool carriage configured for movement along the cross member in a direction parallel the lateral axis, and a vertically moveable shaft operably connected to and configured for movement relative to the tool carriage in a direction parallel the vertical axis, the tool mounted on the vertically moveable shaft;
  c. by means of the cross member, positioning the tool at the point on the horizontal axis;
  d. by means of the tool carriage, positioning the tool at the point on the lateral axis;
  e. by means of the vertically moveable shaft, positioning the tool at the point on the vertical axis; and
  f. manipulating the lid of the railcar using the tool as positioned.

76. The method of claim 75 wherein the cross member is moveable in the direction of travel parallel the horizontal axis by means of mounting on at least one side member arranged parallel and beside the rail tracks.

77. The method of claim 75 further comprising defining a plurality of sequential manipulation points to open and close the lid of the railcar using the tool as the railcar moves along the rail tracks.

78. The method of claim 75 wherein the shaft is rigid to allow accurate positioning of the tool at the point on the vertical axis.

* * * * *